July 26, 1932.                G. BUCKY                1,868,521
VIEWING BOX FOR OBSERVING TRANSLUCENT IMAGES
Filed March 3, 1932
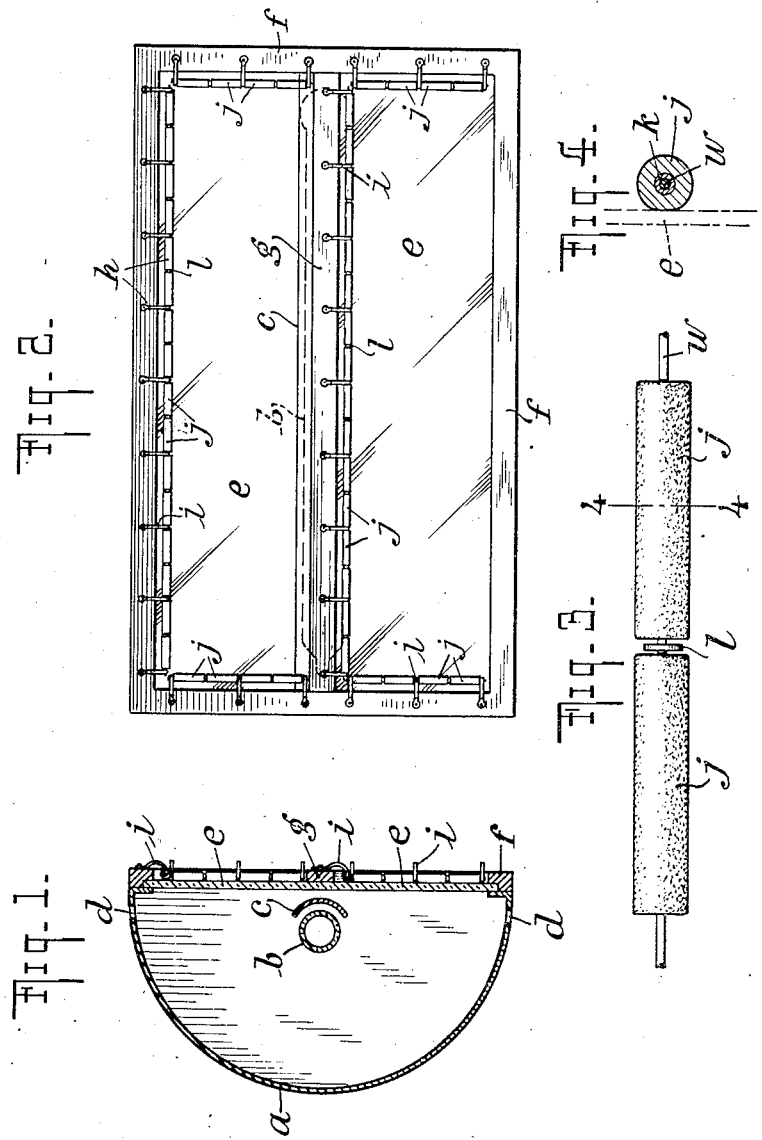
WITNESS
G. V. Rasmussen
INVENTOR
GUSTAV BUCKY
BY
ATTORNEYS Patented July 26, 1932

1,868,521

UNITED STATES PATENT OFFICE

GUSTAV BUCKY, OF NEW YORK, N. Y., ASSIGNOR TO ROEFINAG, AKTIENGESELLSCHAFT, A CORPORATION OF SWITZERLAND

VIEWING BOX FOR OBSERVING TRANSLUCENT IMAGES

Application filed March 3, 1932, Serial No. 596,435, and in Germany August 8, 1930.

My invention relates to an apparatus for viewing translucent images, such as photographic films, against a lighted background. The object of the invention is to provide a background of light rays of the mercury vapor lamp type which are transmitted indirectly to the film only and through a clear or transparent glass plate. More particularly my invention contemplates the provision of a device of simple construction, of safe and inexpensive operation, for use in observing X-ray negatives.

In order to accomplish the objects of the invention, I employ a frame having a backing of suitably curved configuration and capable of transmitting through a clear transparent glass plate, the light rays emanating from a mercury vapor lamp or equivalent source of light having a line spectrum comparable to that of a mercury vapor lamp, said light source being positioned rearwardly of the frame and forwardly of the backing, a shield being interposed between the lamp and the observer to prevent light from being transmitted directly from the lamp to the eye of the observer.

In order to appreciate the underlying principles upon which this invention rests it is necessary to note the essential differences between the nature of the light transmitted by an ordinary source of light, for instance, a tungsten filament lamp, and light transmitted by a mercury vapor lamp. The former develops a high degree of heat, requires considerable current consumption and regulation for films of varying density, and has a band spectrum which has a tendency to blind the observer, even when arranged for indirect lighting, and especially for larger areas or where many units of light source are required, fails to produce an equal, even distribution of light over the whole image to be observed, such as is necessary for the most satisfactory conditions required for making observations. In the case of the mercury vapor lamp the light has peculiar spectral lines which result in giving a more distinct showing of fine detail, but to make the light diffuse with such lamp, it has been found necessary to interpose opalescent or ground glass between the source of light and the observer when using mercury vapor lamps in connection with viewing boxes.

In viewing X-ray negatives it is important in the first instance that the biological effect on the eyes of the observer who sometimes applies himself to his task for a period of several hours or so shall be wholly negative and non-injurious. It is further important that the entire area of such films, frequently about 14 x 17 inches, shall be subject to an equal, even distribution of light over the entire image, as otherwise attention is distracted to areas of greater light intensity and details are overlooked which should be taken into consideration in connection with the observations. It is furthermore important that the equal, even distribution of light over the entire image should prevail with reference to each of a plurality of films when viewed simultaneously.

When viewing a negative through opalescent or ground glass against mercury vapor lamps according to the methods heretofore proposed, it was found necessary generally to employ two lamps because of the absorption of gray intensity by the type of glass which was deemed necessary. The use of two lamps doubled the heat, and doubled the current consumption and the cost, but, more important than all, resulted in the absorption by the opalescent glass of the very wave lengths which are most useful for producing the desired effect. The opalescent glass acts as a color filter and absorbs the best part of the rays of light which I have found most desirable. These mercury vapor light viewing boxes furthermore require to be operated in a darkened room.

I have now discovered that it is possible to obtain the full benefit of the advantages of the line spectrum of the mercury vapor light and the desirable spectral range of such light, provided the viewing apparatus is suitably constructed to this end.

According to the present invention, the apparatus can be operated in daylight, the intensity of light is not subject to the necessity of regulation as is the case when the ordinary filament bulbs are used, and the light produced is just as serviceable for viewing light or dark films. Clear transparent glass is used so that the most desirable rays of the mercury vapor lamp are not absorbed. The distribution of the spectral lines of this special kind of light due to the new combination results in conditions which do not operate to blind the observer. The clear glass is not effective as a color filter but only, so to speak, as a biological filter. These effects are accomplished by so combining the elements of the structure that the glass of the viewing box is clear (white or colored) transparent glass as distinguished from ground or opalescent glass; that the lamp is located behind a shield which prevents any direct rays from the lamp from reaching the eye of the observer and that the rays from the lamp are reflected in an indirect manner through the clear glass plate from an approximately semi-circular light-reflecting surface.

There are details of construction which also enter into the desirability of the improved viewing box but these being auxiliary, they will be taken up in the course of the description.

The invention is shown in the accompanying drawings in which Fig. 1 is a cross-sectional view of a device constructed in accordance with the invention; Fig. 2 is a front view thereof; Fig. 3 is a detail of the film-holding mechanism and Fig. 4 is a section on line 4—4 of Fig. 3.

In the drawing, $a$ is the light-reflecting surface shown as of approximately semicircular shape. The inner surface of this light-distributing element is usually flat white. $b$ is the mercury vapor lamp or a source of light having similar spectral characteristics. $c$ is a shield of such dimensions with relation to the entire apparatus and the mercury vapor lamp as to exclude from the observer all direct rays of light emanating from the lamp. The shield is of arcuate form and may be constructed of aluminum. It is a reflector as well as a shield. $d$ are ventilating apertures which may be arranged at suitable intervals along the length of the reflector $a$. $e$ is a plate of clear transparent glass held in association with the reflector $a$ by the frame $f$. The frame $f$ is preferably divided into two sections by the cross bar $g$ and leaving two glass panels, each preferably having a transverse dimension corresponding to the maximum dimension of the standard X-ray negative, i. e. about 17 inches. The longitudinal extent of the glass panels may be such as to adapt them for use in viewing but one or two negatives but preferably such as to enable more, say eight, to be viewed simultaneously.

In order to conveniently retain the negatives upon the glass panels $b$ for examination by the observer, I have provided a special type of temporary retaining means indicated at $h$. A series of brackets $i$ arranged around the frame $f$—$g$ support a wire $w$ upon which have been loosely mounted wide walled soft-rubber tubular members $j$ which may be provided with a metallic bushing $k$ and be separated by loosely mounted metallic washers $l$ of smaller diameter than that of the rubber tubular members. The wire is so mounted with relation to the glass plate $b$ that the rubber of the tubular members $j$ will be compressed under gentle pressure upon the glass. Whenever a negative is to be viewed, it is slipped under the rubber tubular members and retained against the glass by friction and the tubular members will be available irrespective of the size of any particular negative at whatever place on the apparatus the picture may occupy.

The glass plate $b$ may, of course, consist of two panes, one for each of the two separate panels of the device.

The composition of the glass may include ingredients such as metallic salts so that the glass, while retaining its full transparency, will nevertheless be absorptive of any rays which even remotely might be deemed to have a deleterious biological effect.

In the new apparatus the current consumption is extremely low and the heat developed is so small as to be negligible, being largely dissipated by radiation of the large surface of the curved backing $a$ and by the effect of the ventilating apertures $d$ so that the films which are viewed are not affected by heat and the observer even on hot days does not experience discomfort due to heat from the apparatus such as he had to contend with in using any of the apparatus thus far available. An entirely new type of illumination results from the use of the new apparatus, i. e. an even, equal distribution of practically the whole of the biologically non-injurious rays of a source of light having a line spectrum.

It will be understood that the semicircular backing which carries the reflecting surface $a$ is closed at its ends, forming as it were a trough-like body, the whole of whose inner surface (except for the ventilating holes $d$ when used) including side, bottom, and end walls, is of light-reflecting character.

Various changes in the specific arrangement and construction may, of course, be made without departing from the scope of the invention as defined in the following claims.

I claim:

1. A viewing box for observing translucent images comprising a source of light of the mercury vapor type, a reflecting surface spaced therefrom, a pane of transparent glass in the path of the reflected light and means for preventing direct rays from the lamp passing through the glass pane.

2. A viewing box for observing translucent images comprising a source of light of the mercury vapor type, a curved reflecting surface spaced therefrom, a pane of transparent glass in the path of the rays reflected from the curved reflecting surface, and means for preventing direct rays from the lamp passing through the glass pane.

3. A viewing box for observing translucent images comprising a source of light of the mercury vapor type, a curved reflecting surface spaced therefrom, a pane of transparent glass in the path of the rays reflected from the curved reflecting surface and a shield between the lamp and the glass for preventing direct rays from the lamp passing through the glass pane.

4. A viewing box for observing translucent images comprising a source of light of the mercury vapor type, a reflecting surface spaced therefrom, a pane of transparent glass in the path of the reflected light, means for preventing direct rays from the lamp passing through the glass pane, and a bar extending across the glass in approximately the plane defined by the horizontal central lines of said lamp and of said means for preventing direct rays from said lamp from passing through the glass pane.

5. A device for mounting a film negative for observation comprising a frame, a substantially semicircular backing secured to said frame and having an inner reflecting surface, a transparent glass plate secured within said frame, a source of light of the line spectrum type positioned between said frame and said glass plate, an arcuate shield between said light source and said glass plate, and means on said frame for supporting a film negative thereon for observation by the line spectrum light rays transmitted through said negative.

6. A device for mounting an X-ray plate for observation comprising a frame, a substantially semicircular backing secured to said frame and having an inner reflecting surface, a transparent glass plate secured within said frame, a mercury vapor lamp positioned between said frame and said glass plate, a shield between the lamp and the glass plate, a bar extending horizontally across said frame in approximately the plane defined by the horizontal central lines of said mercury vapor lamp and shield, and means adjacent at least the upper cross bars of said frame for positioning and supporting X-ray plates on the glass plate.

7. A viewing box such as set forth in claim 1 having means adjacent at least the upper visible edge of the glass pane for positioning and supporting X-ray plates on the pane, said means comprising supporting members, a wire supported thereby and a sequence of cylindrical thick-walled elastic tubing sections rotatably supported on the wire and under compressive strain with relation to the pane of glass.

8. A viewing box such as set forth in claim 1 having means adjacent at least the upper visible edge of the glass pane for positioning and supporting X-ray plates on the pane, said means comprising supporting members, a wire supported thereby, a sequence of rigid bushings rotatably mounted on the wire and thick-walled cylindrical elastic tubing sections supported on the bushings and under compressive strain with relation to the pane of glass.

9. A viewing box such as set forth in claim 1 having means adjacent at least the upper visible edge of the glass pane for positioning and supporting X-ray plates on the pane, said means comprising supporting members, a wire supported thereby, a sequence of rigid washers rotatably mounted on the wire, and, intermediate of said washers, a sequence of rotatable cylindrical thick-walled elastic tubing sections of greater diameter than the washers and under compressive strain with relation to the pane of glass.

10. A viewing box such as set forth in claim 1 having means adjacent at least the upper visible edge of the glass pane for positioning and supporting X-ray plates on the pane, said means comprising supporting members, a wire supported thereby, a sequence of rigid washers rotatably mounted on the wire, and, intermediate of the washers, rigid bushings rotatably mounted on the wire, and thick-walled cylindrical elastic tubing sections of greater diameter than the washers supported on the bushings under compressive strain with relation to the pane of glass.

In testimony whereof I have hereunto set my hand.

GUSTAV BUCKY.